United States Patent
Kreuzer et al.

(10) Patent No.: US 11,599,641 B2
(45) Date of Patent: Mar. 7, 2023

(54) FIRMWARE RETRIEVAL AND ANALYSIS

(71) Applicant: CrowdStrike, Inc., Irvine, CA (US)

(72) Inventors: Timo Kreuzer, Schonberg (DE); Ion-Alexandru Ionescu, Seattle, WA (US); Aaron LeMasters, New York, NY (US)

(73) Assignee: CrowdStrike, Inc., Irvine, CA (US)

( * ) Notice: Subject to any disclaimer, the term of this patent is extended or adjusted under 35 U.S.C. 154(b) by 105 days.

(21) Appl. No.: 16/855,585

(22) Filed: Apr. 22, 2020

(65) Prior Publication Data

US 2020/0342110 A1    Oct. 29, 2020

Related U.S. Application Data

(60) Provisional application No. 62/838,207, filed on Apr. 24, 2019.

(51) Int. Cl.
| H04L 29/06 | (2006.01) |
| G06F 21/57 | (2013.01) |
| G06F 13/42 | (2006.01) |
| G06F 21/44 | (2013.01) |

(52) U.S. Cl.
CPC ........ *G06F 21/572* (2013.01); *G06F 13/4221* (2013.01); *G06F 21/44* (2013.01); *G06F 2213/0024* (2013.01); *G06F 2213/0026* (2013.01); *G06F 2221/033* (2013.01)

(58) Field of Classification Search
CPC ......... G06F 21/572; G06F 21/56; G06F 21/44
See application file for complete search history.

(56) References Cited

U.S. PATENT DOCUMENTS

| 9,930,051 B1 | 3/2018 | Potlapally et al. |
| 2003/0204710 A1* | 10/2003 | Culter .................. G06F 9/4403 713/1 |
| 2003/0217193 A1* | 11/2003 | Thurston .................. G06F 8/65 719/321 |

(Continued)

FOREIGN PATENT DOCUMENTS

| CN | 105718825 | 6/2016 |
| KR | 101769714 | 8/2017 |

OTHER PUBLICATIONS

The Extended European Search Report dated Aug. 28, 2020 for European Patent Application No. 20171214.8, 10 pages.

(Continued)

*Primary Examiner* — Jason K Gee
(74) *Attorney, Agent, or Firm* — Lee & Hayes, P.C.

(57) ABSTRACT

A bus filter driver and security agent components configured to retrieve and analyze firmware images are described herein. The bus filter driver may attach to a bus device associated with a memory component and retrieve a firmware image of firmware stored on the memory component. The bus filter driver may also retrieve hardware metadata. A kernel-mode component of the security agent may then retrieve the firmware image and hardware metadata from the bus filter driver and provide the firmware image and hardware metadata to a user-mode component of the security agent for security analysis. The security agent components may then provide results of the analysis and/or the firmware image and hardware metadata to a remote security service to determine a security status for the firmware.

19 Claims, 6 Drawing Sheets

(56) References Cited

U.S. PATENT DOCUMENTS

| | | | | |
|---|---|---|---|---|
| 2004/0073791 A1* | 4/2004 | Vollmer | ............ | H04L 12/40078 |
| | | | | 713/168 |
| 2006/0097040 A1* | 5/2006 | Castillo | ................ | G06F 21/572 |
| | | | | 235/380 |
| 2007/0150715 A1* | 6/2007 | Rothman | .................. | G06F 8/65 |
| | | | | 713/1 |
| 2008/0320311 A1* | 12/2008 | Cho | ..................... | H04L 9/3247 |
| | | | | 713/187 |
| 2009/0086981 A1* | 4/2009 | Kumar | ................ | G06F 21/575 |
| | | | | 726/2 |
| 2012/0110562 A1* | 5/2012 | Heinrich | ................... | G06F 8/65 |
| | | | | 717/169 |
| 2016/0321195 A1* | 11/2016 | Ghosh | ................... | G06F 13/102 |
| 2017/0061127 A1* | 3/2017 | Ionescu | ................ | G06F 21/575 |
| 2018/0225230 A1* | 8/2018 | Litichever | ............. | G06F 13/107 |

OTHER PUBLICATIONS

Tedhudek et al, "Types of WDM Drivers—Windows Drivers | Microsoft Docs", retrieved on Dec. 9, 2019 at <<https://docs.microsoft.com/en-us/windows-hardware/drivers/kernel/types-of-wdm-drivers?redirectedfrom=MSDN#possibledriverlayers>>, 3 pages.

\* cited by examiner

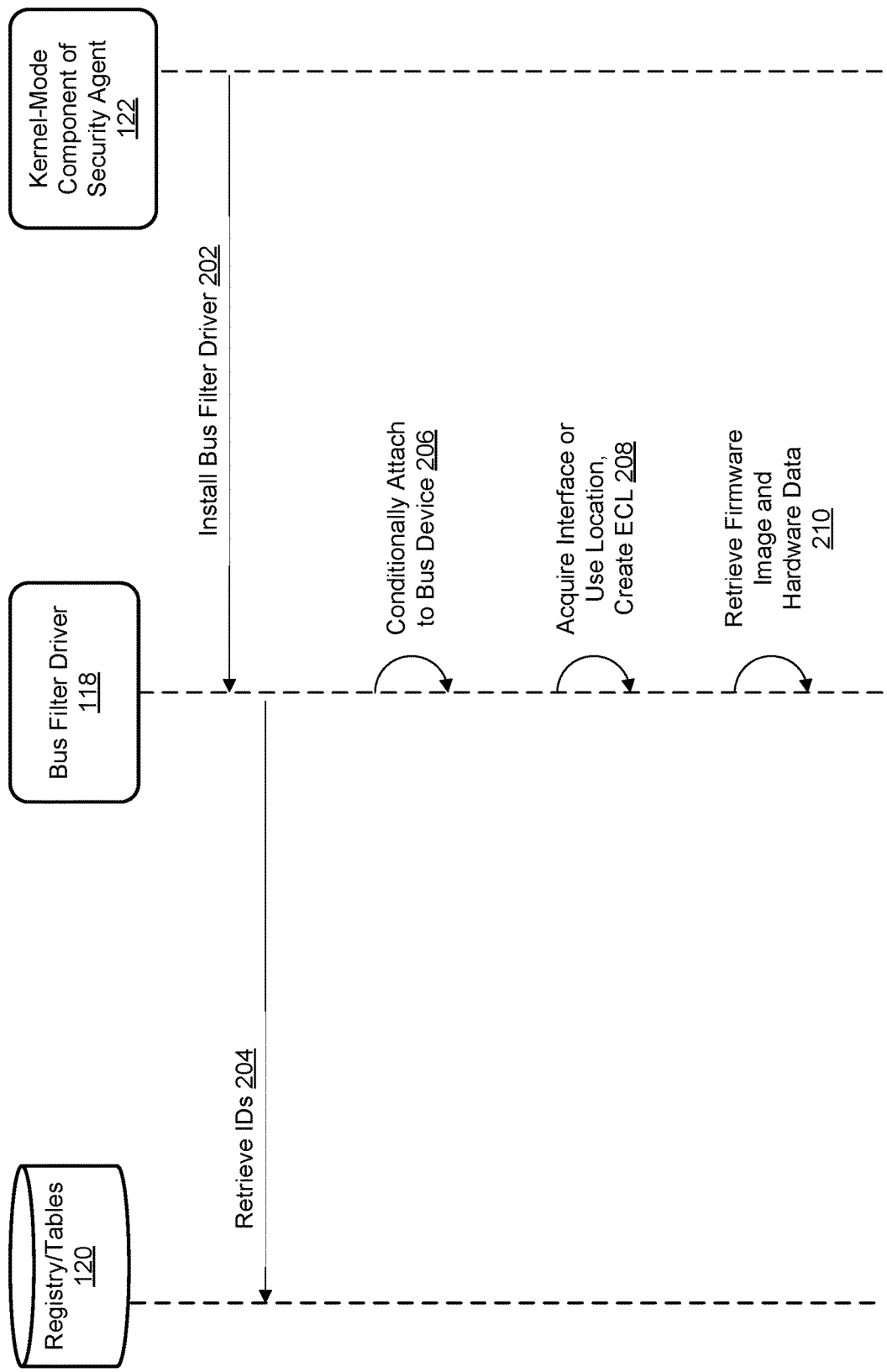

FIRMWARE RETRIEVAL AND ANALYSIS

PRIORITY APPLICATION

This patent application claims priority to U.S. provisional patent application No. 62/838,207, filed on Apr. 24, 2019. Application No. 62/838,207 is hereby incorporated by reference, in its entirety.

BACKGROUND

With Internet use forming an ever-greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

Detecting such security exploits in firmware of a computing device after an operating system (OS) has loaded creates additional risks for that system. Security software may access different memory locations in attempts to find and scan firmware, but such accesses may harm system performance. Other techniques for detecting firmware exploits are also problematic, causing race conditions and other issues. For reasons such as these, firmware scans are often only performed using command line tools before the OS has loaded.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 2a-2b illustrate interactions between components of the computing device, including the bus filter driver and other security agent components, and the remote security service.

DETAILED DESCRIPTION

This disclosure describes, in part, a bus filter driver and other security agent components configured to retrieve and analyze firmware images. The bus filter driver may attach to a bus device associated with a memory component and retrieve a firmware image of firmware stored on the memory component. Such attachment may be conditional based on chipset including the memory component and the retrieval may occur at boot time, responsive to the bus device receiving a start message. The bus filter driver may utilize either a bus interface and/or specific memory locations or offsets, depending on bus driver metadata, in retrieving the firmware image and hardware metadata. The bus filter driver may also retrieve hardware metadata, such as data from one or more registers.

The kernel-mode component of the security agent may then retrieve the firmware image and hardware metadata from the bus filter driver and provide the firmware image and hardware metadata to a user-mode component of the security agent for security analysis. The user-mode component may determine at least one of a security status associated with the firmware or an occurrence of a suspect pattern of information.

The security agent components may then provide results of the analysis and/or the firmware image and hardware metadata to a remote security service to determine a security status for the firmware. In determining security status, the remote security service may compare type information for the computing device (e.g., information about the chipset of the computing device) and at least one of the firmware image or hardware metadata to at least one of prevalence information, expected values for firmware or hardware, or a whitelist or a blacklist.

Overview

Figure 1:
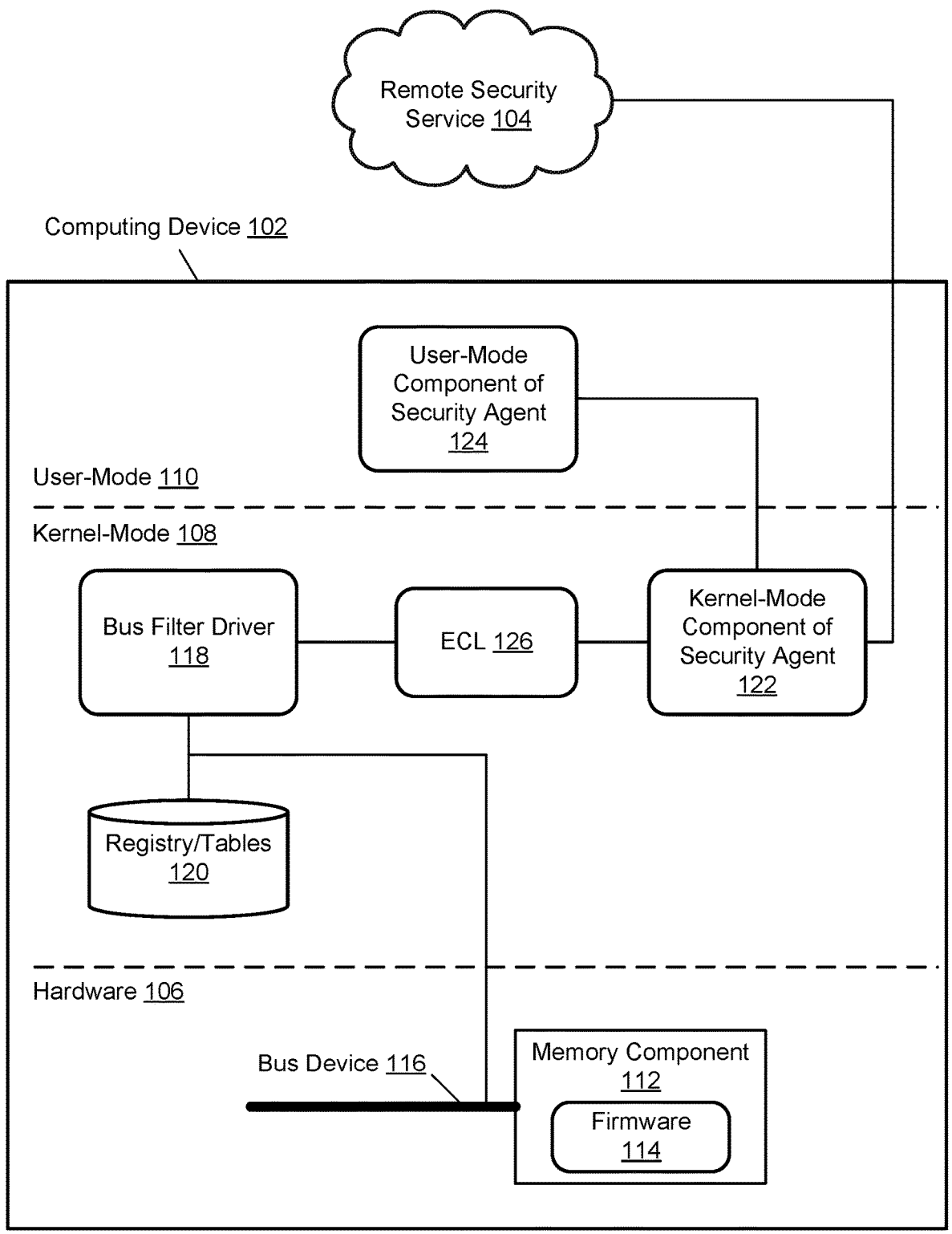
FIG. 1 illustrates an overview of a system including a remote security service and a computing device having a bus filter driver to retrieve a firmware image and other security agent components to analyze the firmware image.

FIG. 1 illustrates an overview of a system including a remote security service and a computing device having a bus filter driver to retrieve a firmware image and other security agent components to analyze the firmware image. As illustrated, a computing device 102 may be in communication with a remote security service 104 and may include hardware 106, kernel-mode components 108, and user-mode components 110. The hardware 106 may include a memory component 112 storing firmware 114 and accessible through a bus device 116. The kernel-mode components 108 include a bus filter driver 118, registry/tables 120, and the kernel-mode component 122 of the security agent. The user-mode components 110 may include a user-mode component 124 of the security agent.

Figure 5:
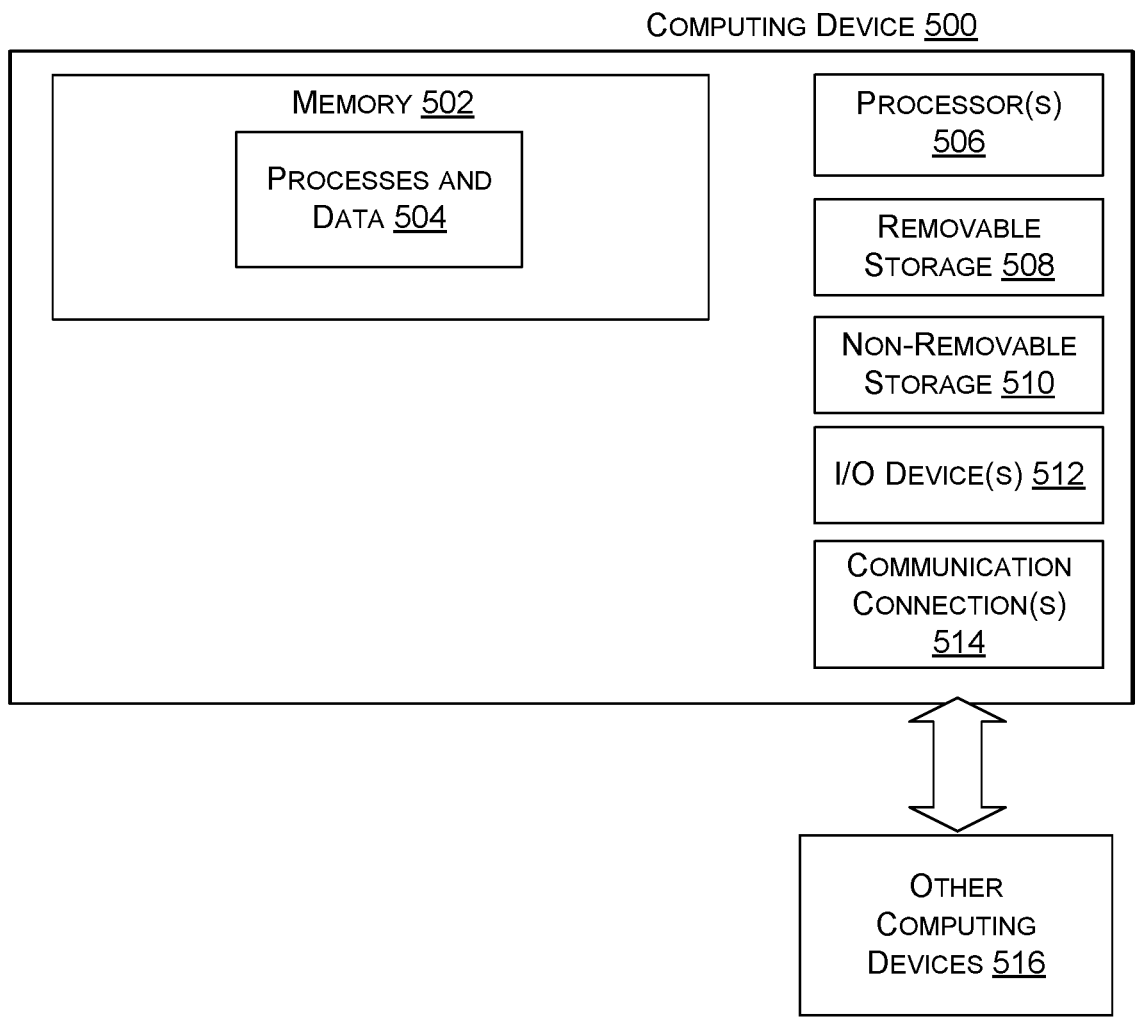
FIG. 5 illustrates a component level view of a computing device configured with a bus filter driver to retrieve a firmware image from a memory component and with other components of a security agent to analyze the firmware image.

In various implementations, the computing device 102 and the device(s) of the remote security service 104 may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the device(s) of the remote security service 104 represent a plurality of computing devices working in communication, such as a cloud computing network of nodes. In some implementations, one or more of the computing device implementing the security agent 102 or the device(s) of the remote security service 104 represent one or more virtual machines implemented on one or more computing devices. An example computing device capable of serving as the computing device 102 or as one of the device(s) of the remote security service 104 is illustrated in FIG. 5 and described below with reference to that figure.

The computing device 102 and the device(s) of the remote security service 104 may be connected by a network. The network may include any one or more networks, such as wired networks, wireless networks, and combinations of wired and wireless networks. Further, the network may include any one or combination of multiple different types of public or private networks (e.g., cable networks, the Internet, wireless networks, etc.). For example, the network may be a private network. In some instances, computing devices communicate over the network using a secure protocol (e.g., https) and/or any other protocol or set of protocols, such as the transmission control protocol/Internet protocol (TCP/IP).

As illustrated in FIG. 1, the computing device 102 includes hardware 106, kernel-mode components 108, and user-mode components 110. The hardware 106 may include tangible components of the computing device 102, such as the memory component 112 and bus device 116. Hardware 106 may also include other tangible components, such as those illustrated in FIG. 5 and described below with reference to that figure. The computing device 102 may also include an OS, a registry (such as registry/tables 120), and applications. The registry is a kernel mode component 108, the OS may include both kernel-mode components 108 and user-mode components 110, and applications may be either or both of kernel-mode components 108 and user-mode components 110.

In some implementations, the bus device 116 and memory component 112 may be associated with a chipset (e.g., a chipset with the Northbridge-Southbridge architecture). The bus device 116 may include a root bus, such as a peripheral component interconnect (PCI) bus or a PCI express (PCIe) bus, and the root bus may in turn include a bus connected to the memory component 112, such as a low pin count (LPC) bus or an enhanced serial peripheral interface (eSPI) bus. The bus device 116 may provide access to connected devices, such as memory component 112, through a PCI bus interface. Such an interface may provide access to components connected to the LPC bus through, e.g., a serial peripheral component base address register (SPIBAR) located through the bus interface. Alternatively, when the bus device 116 includes an eSPI bus or other bus that is not available through the PCI bus interface, access to the memory component 112 may be achieved by way of a specified memory location of the memory component 112.

In various implementations, the memory component 112 may be a flash memory device of the chipset of the computing device 102. As shown in FIG. 1, the memory component 112 may store firmware 114, which may be a basic input output system (BIOS) or a unified extensible firmware interface (UEFI) of the computing device 102.

In addition, kernel-mode components 108 of the computing device 102 may also include an OS stack for attaching to drivers of hardware 106 and enabling the OS and applications to communicate with the hardware 106 through its drivers. The OS stack may include multiple filter drivers, such as upper-device filter drivers or lower-device filter drivers, each attached to a component of hardware 106. In some implementations, a filter driver (e.g., bus filter driver 118) attaching to a bus device (e.g., bus device 116) may attach as an upper-device filter driver. The OS stack may also be referred to as a plug-and-play (PnP) stack and filter drivers as PnP filter drivers (e.g., PnP upper-device filter drivers and PnP lower-device filter drivers).

The registry/tables 120 may be any sort of registry for storing attributes about hardware and software components of the computing device 102. For example, the registry/tables 120 may store a vendor identifier (ID) and/or chipset ID of the chipset of the computing device 102.

In various implementations, the kernel-mode component 122 and user mode-component 124 are both components of a security agent. The security agent may monitor and record activity on the computing device, may analyze the activity, and may generate alerts and events and provide those alerts and events to the remote security service 104. The security agent may be installed by and configurable by the remote security service 104, receiving, and applying while live, configurations of the security agent and its component(s), such as the kernel-mode component 122 and user mode-component 124. An example security agent is described in greater detail in U.S. patent application Ser. No. 13/492,672, entitled "Kernel-Level Security Agent" and filed on Jun. 8, 2012, which issued as U.S. patent number on May 26, 2015.

The security agent may include the bus filter driver 118, the kernel-mode component 122, the user-mode component 124, and an external component library (ECL) 126. Those components are described below in detail with respect to FIGS. 2a-2b.

Example Components and Interactions

Figure 2B:
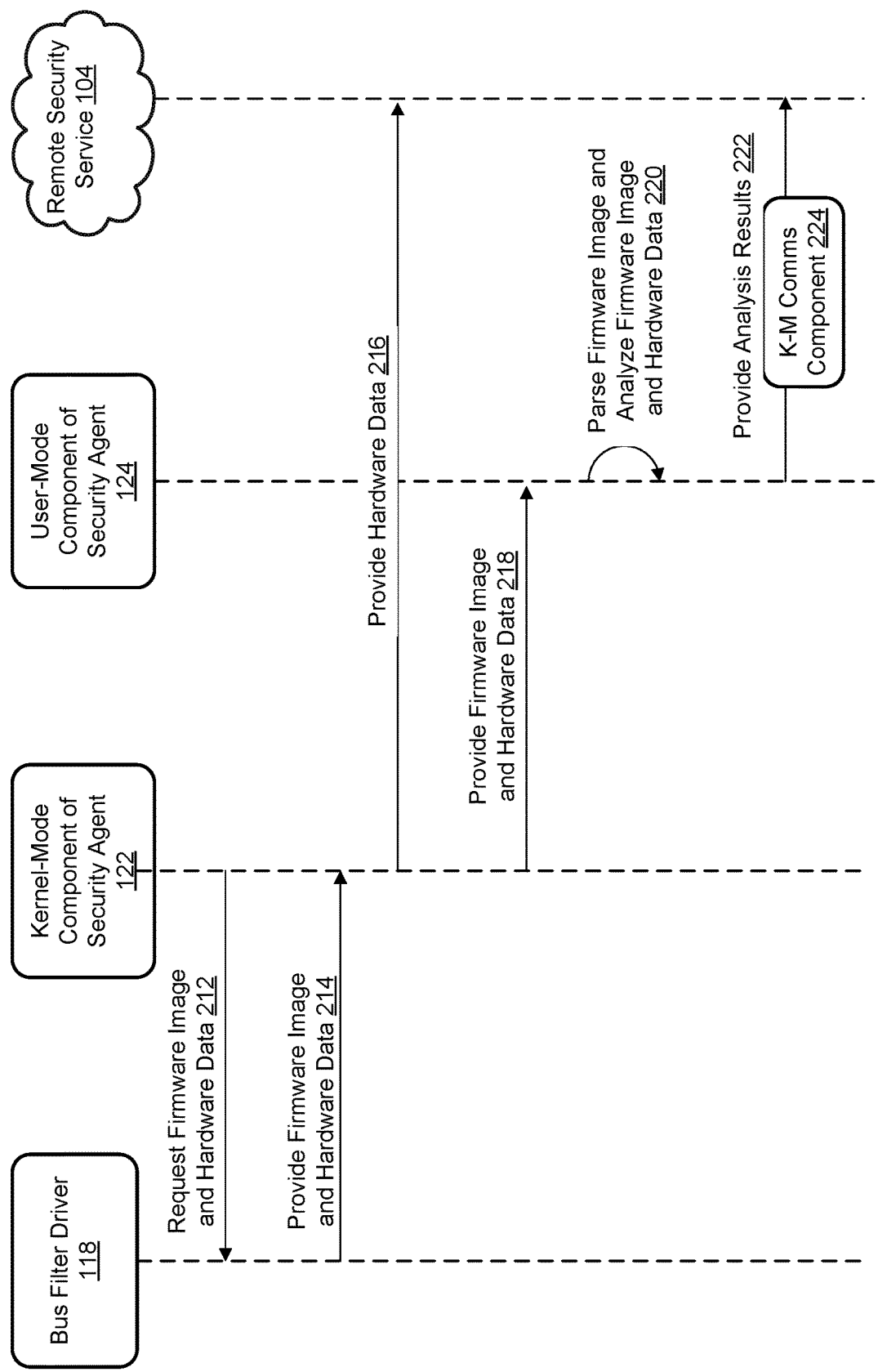

FIGS. 2a-2b illustrate interactions between components of the computing device, including the bus filter driver and other security agent components, and the remote security service.

As illustrated in FIG. 2a, the kernel-mode component 122 of the security agent may install, at 202, the bus filter driver 118. The kernel-mode component 122 may include one or more components configured to retrieve information from hardware 106, communicate with an ECL 126, update the registry/tables 120, and communicate with the user-mode component 124 and the remote security service 104.

The bus filter driver 118 may be a PnP upper-device filter driver installed, at 202, in the OS/PnP stack of the computing device 102. At 204, after installation, the bus filter driver 118 may retrieve, from the registry/tables 120 a vendor ID and/or chipset ID identifying a version of the chipset of the computing device 102. At 206, if the vendor ID and/or chipset ID are among those supported (e.g., according to a configuration of the bus filter driver 118), the bus filter driver 118 attaches to the bus device 116 (e.g., by attaching to a driver of the bus device 116). This attachment enables the bus filter driver 118 to passively receive messages/information from the bus device 116 and components connected to the bus device 116.

The bus filter driver 118 is further configured to either acquire, at 208, the bus interface (e.g., a PCI bus interface) of the bus device 116 or identify a specified memory location. The bus filter driver 118 may elect between these alternatives based on bus driver metadata, such as a version or type of the bus filter driver 118. For example, if the type of the bus driver 116 is LPC, the bus filter driver 118 may acquire the bus interface and utilize the bus interface to identify (e.g., through the SPIBAR) the location of the memory component 112. If the type of the bus driver 116 is eSPI, then the bus filter driver 118 may utilize a specified memory location as the location of the memory component 112. In some cases, the bus filter driver 118 may elect to acquire the bus interface regardless of the type of bus driver 116. In this case, if the type of the bus driver 116 is LPC, there may be an additional memory address offset, if the type of the bus driver 116 is eSPI, there may not be an additional memory address offset.

Also at 208, the bus filter driver 118 may create an ECL 126 for communication with the kernel-mode component 122, enabling bi-directional communication through the ECL 126.

In various implementations, at 210, the bus filter driver 118 may receive, via the OS/PnP stack, a start message sent to the bus device 116 at boot up of the computing device 102. A IRP_MN_START_DEVICE message is an example of such a start message. Responsive to the start message, the bus filter driver 118 may retrieve, at 210, a firmware image of the firmware 114 and may retrieve hardware data, such as processor-related register values, PCI config-related register values, memory-mapped input/output (MMIO)-related register values, SPIBAR related register values, or extensible firmware interface (EFI) variables. In some implementations, the bus filter driver 118 may be configured to only retrieve, at 210, the firmware image and hardware data responsive to receipt by the bus driver 116 of a start message and not to retrieve, at 210, the firmware image and hardware data at other times. In some implementations, if the vendor ID/chipset ID at 204 indicates that the chipset is not supported, then the bus filter driver 118 retrieves a subset of hardware metadata.

As illustrated in FIG. 2b, at 212, the kernel-mode component 122 requests the firmware image and hardware metadata from the bus filter driver 118. Such a request may be transmitted through the ECL 126, which may be created by the bus filter driver 118, by the kernel-mode component 122, or by both. The kernel-mode component 122 may send the request upon coming online after a boot of the computing device 102. At 214, the kernel-mode component 122 receives the firmware image and metadata. In some implementations, if the chipset is not supported, the kernel-mode component 122 receives a subset of the hardware metadata rather than the firmware image and hardware metadata.

In various implementations, upon receiving the firmware image and hardware metadata, the kernel-mode component 122 may send, at 216, a subset of the hardware metadata to the remote security service 104 and may send, at 218, the firmware image and hardware metadata to the user-mode component 124 for analysis.

At 220, the user-mode component 124 may parse the firmware image and analyze both the parsed firmware image and hardware metadata. Such analysis could include determining a security status of the firmware 114 or detecting a pattern of suspicious activity, also known as an "indicator of attack." In some implementations, the user-mode component 124 may also hash the parsed firmware image and/or hardware metadata. At 222, the user-mode component 124 may then provide results of the analysis, the parsed firmware image, the hardware metadata, and/or the hashes to the remote security service 104 through a kernel-mode communications component 224.

The remote security service 104 may then determine a security status for the firmware 114. In determining security status, the remote security service 104 may compare type information for the computing device 102 (e.g., information about the chipset of the computing device 102) and at least one of the firmware image or hardware metadata to at least one of prevalence information, expected values for firmware 114 or hardware 106, or a whitelist or a blacklist. The prevalence information may be based on a reference source or may be constructed from firmware images and/or hardware metadata received from multiple computing devices.

In some implementations, the kernel-mode component 122 may receive notice of a power resume for the computing device 102 (e.g., returning from sleep mode or a low power mode). Upon receiving the notice, the kernel-mode component 122 may request hardware metadata from the bus filter driver 118 through the ECL 126. The bus filter driver 118 may then retrieve a subset of the hardware data, such as hardware metadata available without use of the bus interface, and provide that hardware metadata to the kernel-mode component 122 through the ECL 126.

Example Processes

Figure 3:
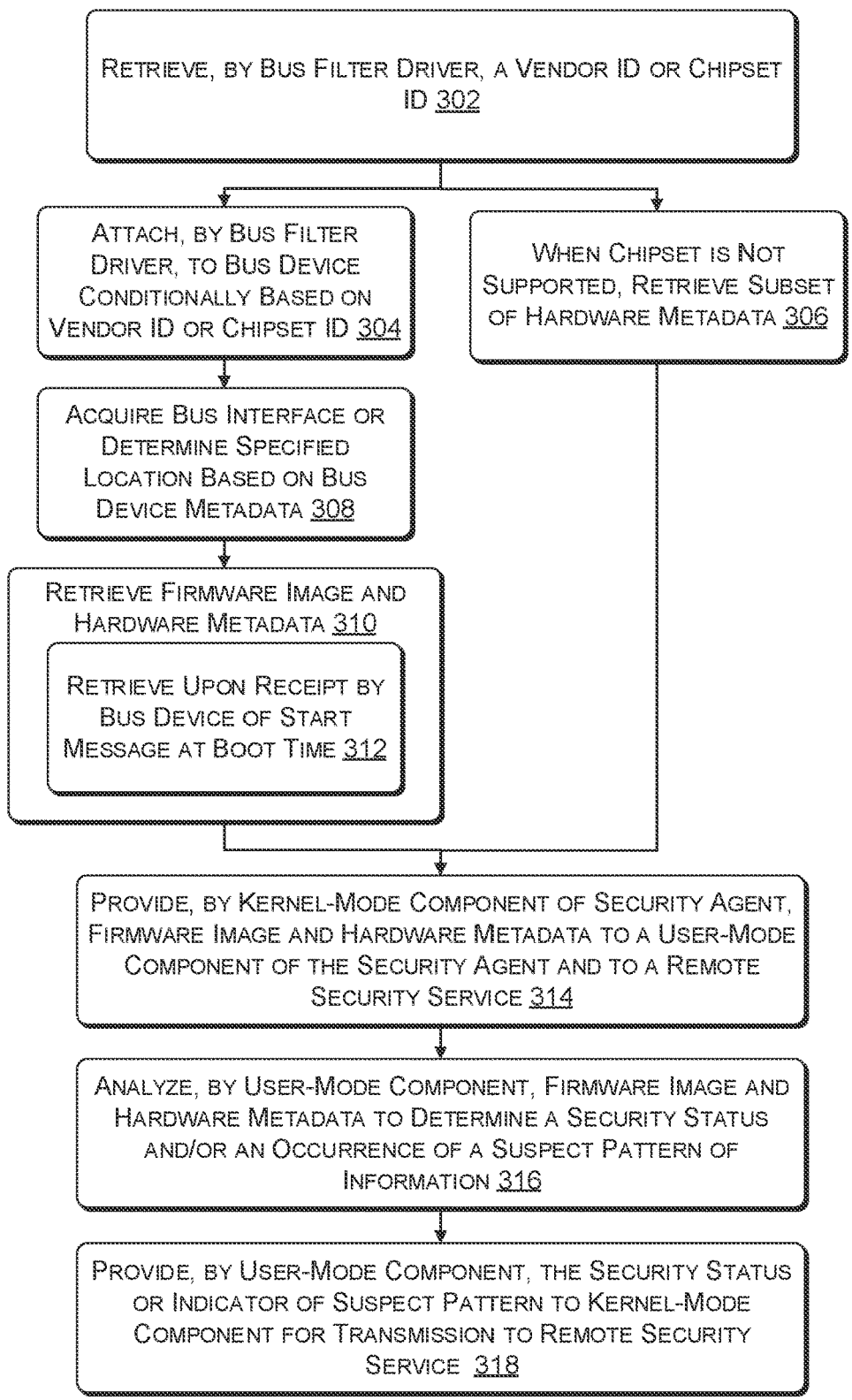
FIG. 3 illustrates an example process for retrieving a firmware image and hardware metadata, analyzing the retrieved firmware image and metadata, and providing results of the analysis and/or the firmware image and hardware metadata to a remote security service.
Figure 4:
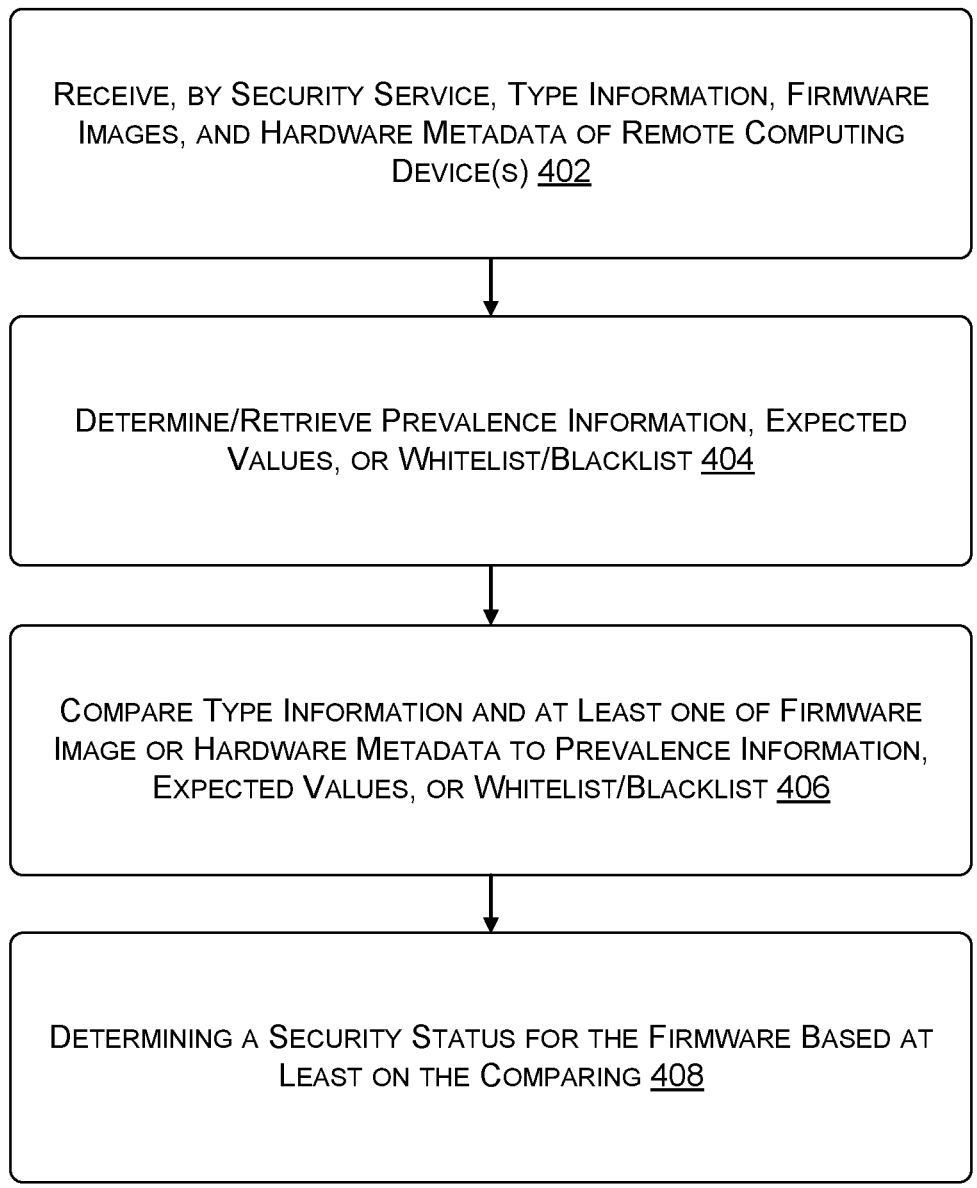
FIG. 4 illustrates an example process for a security service to retrieve firmware images and hardware metadata from computing devices and to determine security statuses for those devices based on the firmware images and metadata.

FIGS. 3-4 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates an example process for retrieving a firmware image and hardware metadata, analyzing the retrieved firmware image and metadata, and providing results of the analysis and/or the firmware image and hardware metadata to a remote security service. The process includes, at 302, a bus filter driver on a computing device retrieving a vendor identifier and/or chipset identifier for a memory component of the computing device from a registry. In some implementations, the bus filter driver may be a PnP upper-device filter driver.

At 304, the bus filter driver conditionally attaches to the bus device based on the vendor identifier and/or chipset identifier indicating that the chipset is supported. In some implementations, the bus device may include a PCI bus or PCIe bus, and the PCI bus or PCIe bus may include a LPC bus or an eSPI bus connected to the memory component.

At 306, when a chipset of the computing device is not supported, the bus filter driver extracts a subset of firmware information, chipset information, or register values.

When the chip set of the computing device is supported, the operations continue as shown at 308-312. At 308, the bus filter driver i) acquires a bus interface and utilize the bus interface to locate the memory component or ii) uses a specified memory location as a memory location of the memory component. The acquisition of the bus interface or use of the specified memory location may be based on a comparison of hardware metadata, such as bus device metadata, to a specified date or specified version.

At 310, the bus filter driver retrieves a firmware image of the firmware from the memory component. At 312, the retrieval may occur responsive to receipt of a start message by the bus device at boot time of the computing device. The bus filter driver may further retrieve hardware metadata from at least one of chipset tables or registers. The hardware metadata may include at least one of processor-related register values, PCI config-related register values, MMIO-related register values, SPIBAR-related register values, or EFI variables.

At 314, a kernel-mode component of the security agent may retrieve the firmware image and hardware metadata from the bus filter driver and provide the firmware image and/or hardware metadata to a user-mode component of the security agent and to a remote security service. In some implementations, the kernel-mode component may access the firmware image and hardware metadata from the bus filter driver via an ECL.

At 316, the user-mode component of the security agent analyzes the firmware image and the hardware metadata to determine at least one of a security status associated with the firmware or an occurrence of a suspect pattern of information. In some implementations, the analysis may include performing, based on the firmware image and hardware metadata, at least one of determining indicators of attack, determining prevalence for the firmware, determining presence of the firmware on whitelists or blacklists, or determining that the firmware is an expected firmware for hardware of the computing device.

At 318, the user-mode component of the security agent then provides the security status or the indicator of the suspect pattern to the kernel-mode component for transmission to the remote security service.

FIG. 4 illustrates an example process for a security service to retrieve firmware images and hardware metadata from computing devices and to determine security statuses for those devices based on the firmware images and metadata.

The process includes, at 402, a security service receiving, from a remote computing device, type information for the remote computing device, a firmware image of firmware of the remote computing device, and hardware metadata of the remote computing device. The firmware image and the hardware metadata data may be received from a kernel-mode component of a security agent of the remote computing device. The security agent may further be configured to implement a bus filter driver on the remote computing device for retrieving the firmware image and the hardware metadata data.

At 404, the security service determines or retrieves at least one of prevalence information, expected values for firmware or hardware, or a whitelist or a blacklist. In some implementations, the prevalence information is based on a reference source or is constructed from firmware images and/or hardware metadata received from multiple remote computing devices.

At 406, the security service compares the type information and at least one of the firmware image or hardware metadata to at least one of the prevalence information, the expected values for firmware or hardware, or the whitelist or blacklist.

At 408, the security service determines a security status for the firmware based at least on the comparing.

Example System

FIG. 5 illustrates a component level view of a computing device configured with a bus filter driver to retrieve a firmware image from a memory component and with other components of a security agent to analyze the firmware image. As illustrated, computing device 500 comprises a memory 502 storing processes and data 504. Also, computing device 500 includes processor(s) 506, a removable storage 508 and non-removable storage 510, input/output device(s) 512, and communication connections 514 for communicating with other computing devices 516.

In various embodiments, memory 502 is volatile (such as RAM), non-volatile (such as ROM, flash memory, etc.) or some combination of the two. The processes and data 504 may be any sort of processes and data, such as firmware 114, bus filter driver 118, registry/tables 120, kernel-mode component 122, user-mode component 124, ECL 126, or kernel-mode communications component 224, which are described above in detail with respect to FIGS. 1, 2a, and 2b.

In some embodiments, the processor(s) 506 is a central processing unit (CPU), a graphics processing unit (GPU), or both CPU and GPU, or other processing unit or component known in the art.

Computing device 500 also includes additional data storage devices (removable and/or non-removable) such as, for example, magnetic disks, optical disks, or tape. Such additional storage is illustrated in FIG. 5 by removable storage 508 and non-removable storage 510.

Non-transitory computer-readable media may include volatile and nonvolatile, removable and non-removable tangible, physical media implemented in technology for storage of information, such as computer readable instructions, data structures, program modules, or other data. System memory 502, removable storage 508 and non-removable storage 510 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device 500. Any such non-transitory computer-readable media may be part of the computing device 500.

Computing device 500 also has input/output device(s) 512, such as a keyboard, a mouse, a touch-sensitive display, a voice input device, a camera, a display, speakers, a printer, etc. These devices are well known in the art and need not be discussed at length here.

Computing device 500 also contains communication connections 514 that allow the computing device 500 to communicate with other computing devices 516, such as device(s) of a remote security service 104 (when the computing device 500 is an example of computing device 102) or computing device 102 (when the computing device 500 is an example of device(s) of a remote security service 104).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
   a memory component configured to store firmware;
   a bus device communicatively coupled to the memory component;
   a bus filter driver configured to:
   attach to the bus device,
   retrieve bus device metadata including a date from the bus device,
   if the date is less recent than a specific date, retrieve a firmware image of the firmware from the memory component responsive to receipt of a start message by the bus device, and
   create an external component library (ECL) for communication with a kernel-mode component; and a security agent configured to:
retrieve, via the ECL, the firmware image from the bus filter driver, and
perform a security analysis of the firmware image.

2. The computing device of claim 1, wherein the bus filter driver is further configured to acquire a bus interface and utilize the bus interface to locate the memory component.

3. The computing device of claim 1, wherein the bus filter driver is configured to attach to the bus device conditionally based on at least one of a vendor identifier or chipset identifier associated with the memory component.

4. The computing device of claim 3, wherein the bus filter driver is configured to retrieve at least one of the vendor identifier or chipset identifier from a registry and to extract a subset of firmware information, chipset information, or register values when a chipset of the computing device is not supported.

5. The computing device of claim 1, wherein the security agent includes the kernel-mode component and a user-mode component, the kernel-mode component providing at least metadata associated with the firmware image, memory component, or bus device to a remote security service for analysis and the user-mode component parsing and analyzing at least the firmware image.

6. The computing device of claim 1, wherein the bus device includes a peripheral component interconnect (PCI) bus or PCI express (PCIe) bus, and the PCI bus or PCIe bus includes a low pin count (LPC) bus or an enhanced serial peripheral interface (eSPI) bus connected to the memory component.

7. The computing device of claim 1, wherein the bus filter driver is a plug-and-play (PnP) upper-device filter driver.

8. The computing device of claim 1, wherein the security agent is configured to perform, based on the firmware image and hardware metadata, at least one of determining indicators of attack, determining prevalence for the firmware, determining presence of the firmware on whitelists or blacklists, or determining that the firmware is an expected firmware for hardware of the computing device.

9. The computing device of claim 1, wherein the bus filter driver is further configured to retrieve hardware metadata from at least one of chipset tables or registers.

10. The computing device of claim 9, wherein the hardware metadata includes at least one of processor-related register values, peripheral component interconnect (PCI) config-related register values, memory-mapped input/output (MMIO)-related register values, serial peripheral interface base address register (SPIBAR) related register values, or extensible firmware interface (EFI) variables.

11. A method performed by a computing device, the method comprising:
attaching a bus filter driver to a bus device of the computing device, the bus device communicatively coupled to a memory component of the computing device storing firmware;
retrieving bus device metadata including a date from the bus device;
if the date is less recent than a specific date, retrieving a firmware image of the firmware from the memory component in response to receiving a start message from the bus device;
creating an external component library (ECL) for communication with a kernel-mode component;
retrieving, by a security agent via the ECL, the firmware image from the bus filter driver; and
performing, by the security agent, a security analysis off the firmware image.

12. The method of claim 11, further comprising:
acquiring, by the bus filter driver, a bus interface; and
utilizing, by the bus filter driver, the bus interface for locating the memory component.

13. The method of claim 11, wherein attaching the bus filter driver to the bus device includes:
conditionally attaching the bus filter driver to the bus device based on at least one of a vendor identifier or chipset identifier associated with the memory component.

14. The method of claim 11, wherein the security agent includes the kernel-mode component and a user-mode component, the kernel-mode component providing at least metadata associated with the firmware image, memory component, or bus device to a remote security service for analysis and the user-mode component parsing and analyzing at least the firmware image.

15. The method of claim 11, further comprising:
determining, by the security agent, based on the firmware image and hardware metadata, at least one of:
indicators of attack,
prevalence for the firmware,
presence of the firmware on whitelists or blacklists, or
the firmware being an expected firmware for hardware of the computing device.

16. One or more non-transitory computer readable storage media storing thereon computer-executable instructions that, when executed by one or more processors, perform operations comprising:
conditionally attaching a bus filter driver to a bus device of a computing device based on at least one of a vendor identifier or chipset identifier associated with a memory component of the computing device, the bus device communicatively coupled to the memory component storing firmware;
retrieving bus device metadata including a date from the bus device;
if the date is less recent than a specific date, retrieving a firmware image of the firmware from the memory component in response to receiving a start message from the bus device;
creating an external component library (ECL) for communication with a kernel-mode component;
retrieving, by a security agent via the ECL, the firmware image from the bus filter driver; and
performing, by the security agent, a security analysis off the firmware image.

17. The one or more non-transitory computer readable storage media of claim 16, wherein the operations further comprise:
acquiring, by the bus filter driver, a bus interface; and
utilizing, by the bus filter driver, the bus interface for locating the memory component.

18. The one or more non-transitory computer readable storage media of claim 16, wherein the security agent includes the kernel-mode component and a user-mode component, the kernel-mode component providing at least metadata associated with the firmware image, memory component, or bus device to a remote security service for analysis and the user-mode component parsing and analyzing at least the firmware image.

19. The one or more non-transitory computer readable storage media of claim 16, wherein the operations further comprise:

determining, by the security agent, based on the firmware image and hardware metadata, at least one of:
indicators of attack,
prevalence for the firmware,
presence of the firmware on whitelists or blacklists, or
the firmware being an expected firmware for hardware of the computing device.

* * * * *